(12) United States Patent
Hill

(10) Patent No.: US 6,396,040 B1
(45) Date of Patent: May 28, 2002

(54) AMBIENT LIGHT SENSOR

(75) Inventor: Jonathan W. Hill, Scarborough, ME (US)

(73) Assignee: Control Devices, Inc., Standish, ME (US)

( * ) Notice: Subject to any disclaimer, the term of this patent is extended or adjusted under 35 U.S.C. 154(b) by 0 days.

(21) Appl. No.: 09/508,789

(22) PCT Filed: Oct. 12, 1999

(86) PCT No.: PCT/US99/23746

§ 371 (c)(1),
(2), (4) Date: Aug. 4, 2000

§ 102(e) Date: Aug. 4, 2000

(87) PCT Pub. No.: WO00/22881

PCT Pub. Date: Apr. 20, 2000

Related U.S. Application Data

(60) Provisional application No. 60/103,850, filed on Oct. 12, 1998.

(51) Int. Cl.[7] .............................. B60Q 1/08; H05B 37/02
(52) U.S. Cl. ................................ 250/205; 250/214 AL; 250/226; 315/82
(58) Field of Search .......................... 250/205, 214 AL, 250/214 R, 226, 214.1; 315/77, 82; 362/464, 465, 466

(56) References Cited

U.S. PATENT DOCUMENTS

| | | | |
|---|---|---|---|
| 2,423,278 A | 7/1947 | Willis, Jr. ..................... 315/82 |
| 2,827,594 A | 3/1958 | Rabinow ..................... 315/83 |
| 2,944,188 A | 7/1960 | Lohr et al. ..................... 315/83 |
| 3,657,549 A | 4/1972 | Low et al. .................. 250/209 |
| 3,925,244 A | 12/1975 | Nagasawa et al. ........... 250/372 |
| 4,613,791 A | 9/1986 | Kurihara et al. ............... 315/82 |
| 4,629,941 A | 12/1986 | Ellis et al. ................... 315/153 |
| 4,665,321 A | 5/1987 | Chang et al. ........... 307/10 LS |
| 4,701,611 A | 10/1987 | Kissinger ..................... 250/227 |
| 4,709,145 A | 11/1987 | Spillman, Jr. ................ 250/227 |
| 4,728,861 A | 3/1988 | Kurihara et al. ............... 315/83 |
| 4,870,264 A | 9/1989 | Beha ........................... 250/209 |
| 4,933,550 A | 6/1990 | Hegyi ..................... 250/237 R |
| 4,937,443 A | 6/1990 | Smoot ........................ 250/221 |
| 5,029,276 A | 7/1991 | Buehler et al. ........... 250/208.2 |
| 5,036,437 A | 7/1991 | Macks ......................... 362/61 |
| 5,064,274 A | 11/1991 | Alten ......................... 359/604 |
| 5,072,106 A | 12/1991 | Osawa ..................... 250/206.1 |
| 5,117,744 A | 6/1992 | Zimmer et al. ................ 454/75 |
| 5,182,502 A | 1/1993 | Slotkowski et al. ......... 315/159 |
| 5,235,178 A | 8/1993 | Hegyi ........................ 250/226 |
| 5,416,318 A | 5/1995 | Hegyi ........................ 250/226 |
| 5,426,294 A | 6/1995 | Kobayashi et al. .......... 250/226 |
| 5,434,407 A | 7/1995 | Bauer et al. ............ 250/227.24 |
| 5,483,107 A | 1/1996 | Xander ...................... 307/10.8 |
| 5,523,557 A | 6/1996 | Bruno ..................... 250/214.1 |
| 5,530,240 A | 6/1996 | Larson et al. ......... 250/214 AL |
| 5,537,003 A | 7/1996 | Bechtel et al. ................ 315/82 |
| 5,550,677 A | 8/1996 | Schofield et al. ........... 359/604 |
| 5,602,384 A | 2/1997 | Nunogaki et al. ........ 250/203.4 |
| 5,650,608 A | 7/1997 | Redford et al. ............. 250/210 |
| 5,670,774 A | 9/1997 | Hill ......................... 250/203.4 |
| 5,726,441 A | 3/1998 | Samukawa et al. ...... 250/214.1 |
| 5,783,819 A | 7/1998 | Shimoyama et al. ........ 250/239 |
| 5,796,094 A | 8/1998 | Schofield et al. ......... 250/208.1 |

(List continued on next page.)

*Primary Examiner*—John R. Lee
(74) *Attorney, Agent, or Firm*—Woodard, Emhardt, Naughton Moriarty & McNett

(57) ABSTRACT

An improved ambient light sensor 20 is provided. Light 105 passes to at least two photosensors 30, 35 with different peak response frequencies. A controller 80 accepts output signals from the photosensors 30, 35 and operates vehicle systems (e.g., headlights 70 or environmental controls 75) accordingly. The controller 80 may distinguish between natural and artificial light, so that headlights 70 are illuminated while a vehicle passes through a well lit tunnel, or is exposed to lights from another vehicle.

26 Claims, 3 Drawing Sheets

U.S. PATENT DOCUMENTS

| | | | |
|---|---|---|---|
| 5,834,765 A | * 11/1998 | Ashdown | 250/214 AL |
| 5,835,613 A | 11/1998 | Breed et al. | 382/100 |
| 5,837,994 A | 11/1998 | Stam et al. | 250/208.1 |
| 5,837,995 A | 11/1998 | Chow et al. | 250/214 LS |
| 5,845,000 A | 12/1998 | Breed et al. | 382/100 |
| 5,877,897 A | 3/1999 | Schofield et al. | 359/604 |
| 5,965,986 A | 10/1999 | Borho et al. | 315/80 |
| 5,998,929 A | 12/1999 | Bechtel et al. | 315/82 |
| 6,097,023 A | 8/2000 | Schofield et al. | 250/208.1 |
| 6,102,546 A | 8/2000 | Carter | 359/604 |
| 6,130,421 A | 10/2000 | Bechtel et al. | 250/208.1 |

* cited by examiner

AMBIENT LIGHT SENSOR

CROSS REFERENCE TO RELATED APPLICATIONS

This application claims priority to U.S. Provisional Patent Application No. 60/103,850, filed Oct. 12, 1998.

FIELD OF THE INVENTION

The present invention relates to a sensor for producing one or more electrical signals which are proportional to the spectral content of electromagnetic energy incident upon the sensor. More specifically, the present invention relates to a sensor and processor for controlling the headlights or passenger heating and cooling system of a vehicle in response to ambient light conditions.

BACKGROUND OF THE INVENTION

Many automobile drivers prefer that certain systems be adjusted automatically based upon weather and ambient light conditions. For example, when driving at night, in rain, or through a tunnel, drivers prefer headlights to be illuminated. Artificial lighting in a tunnel or headlights on other vehicles preferably do not defeat the automatic illumination of headlights under those conditions. Bright sunlight, however, might indicate that full-strength headlight illumination is unnecessary.

In prior systems for distinguishing between natural and artificial light, filters have been used to pass light from two different portions of the visible spectrum (or from a narrow band and a broad band of the visible spectrum) to two identical photodiodes that respond to the total amount of light reaching their surface. When filters are used, however, the light energy reaching the photodiode is substantially attenuated. This makes the circuit more susceptible to noise in the photodiode output signal.

Another prior system for distinguishing between natural and artificial light focuses unfiltered light on one photodiode while focusing light through a blue filter onto a second photodiode. To compare the photodiode outputs, the signal responsive to the blue-filtered light must be normalized prior to the comparison. Again, this normalization makes the system more sensitive to noise in the second photodiode.

While these and other prior systems attempt to match sensor response to the objective response of the human eye to visible light, it has been discovered that the subjective response of many drivers to ambient light also depends upon the amount and spectral content of light received that lies outside the visible spectrum. For example, drivers feel cooler on overcast days than on sunny days.

SUMMARY OF THE INVENTION

It is an object of the present invention to provide an improved ambient light sensor.

It is yet another object of the present invention to provide an ambient light sensor which is capable of more accurately distinguishing between natural and artificial ambient light.

These objects and others have been achieved through the design of a vehicle system controller that uses photosensors with different peak response frequencies to distinguish between ambient natural and artificial light. In one embodiment, the peak response from one photodiode occurs in the visible spectrum, while the peak response from another photodiode occurs in the infrared spectrum.

In some embodiments, an anti-reflective coating is used on at least a portion of one photodiode.

In some embodiments, the controller turns the vehicle headlights on (or leaves them on) in spite of substantial artificial light in a tunnel. In some embodiments, the controller turns the vehicle headlights on (or leaves them on) in spite of receiving substantial artificial light from another vehicle.

In some embodiments, the controller operates an environmental control system (for example, for heating and cooling the vehicle) based at least in part on the quantity and/or type of ambient light received.

DESCRIPTION OF THE PREFERRED EMBODIMENT

Figure 2:
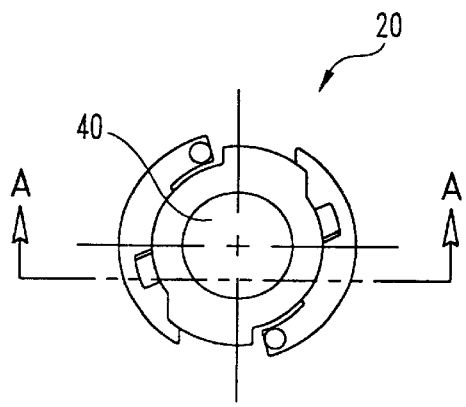
FIG. 2 is a top plan view of the sensor of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention relates to a sensor which comprises at least two photosensors (for example, photodiodes) with different spectral responses. Based on a comparison of the responses of the two different photodiodes, a controller can make a determination as to the nature of the light being received by the sensor, and actuate one or more systems on a vehicle. For example, the controller can compare the output of the two photodiodes to determine that the light being received is from a relatively low temperature artificial source, such as a tungsten bulb, and not from a high temperature source, such as the sun. The controller can then control the headlights of the vehicle, or control the passenger heating and cooling system.

As used in this application, the terms "light" and "electromagnetic energy" refer to all electromagnetic radiation emanating from a source. The term "visible light" refers to visible electromagnetic radiation, which extends from a wavelength of about 430 nanometers to a wavelength of about 690 nanometers. The terms "infrared" or "infrared energy" refer to those wavelengths of electromagnetic energy longer than about 690 nanometers and less than about 1200 nanometers.

In one embodiment of the present invention, the sensor includes two photodiodes which receive light that has passed through a diffuser. Both photodiodes receive substantially the same amount of light. Each photodiode produces an output electrical signal in response to ambient light incident upon it. The magnitude of the electrical signal depends upon not only the magnitude and spectral content of the light, but also the spectral response of the photodiodes.

A first photodiode has a first spectral response with a peak sensitivity that is preferably at a wavelength longer than about 900 nanometers. Since visible light includes wavelengths less than about 690 nanometers and more than about 430 nanometers, the first photodiode responds more to infrared energy than visible light.

The second photodiode has a spectral response that is shifted toward shorter wavelengths than the spectral response of the first photodiode. Preferably, the second photodiode has a peak response at a wavelength that is at least about 150 nanometers less than the wavelength corresponding to the peak response of the first photodiode, and preferably the second peak spectral sensitivity is at a wavelength less than about 750 nanometers. In one embodiment of the present invention, the peak spectral sensitivity of the second photodiode occurs at about 660 nanometers, which is within the range of visible light. The second photodiode is more sensitive to shorter wavelengths of electromagnetic energy, especially visible light, than the first photodiode. However, the second photodiode is less sensitive than the first photodiode to longer wavelengths of electromagnetic energy, especially infrared energy.

The different spectral sensitivities of the first and second photodiodes are accomplished without the use of a filter on either photodiode. In some embodiments of the present invention, the first photodiode is preferably a silicon photodiode, and the second photodiode is preferably a gallium arsenic phosphide (GaAsP) photodiode or a gallium phosphide (GaP) photodiode. In other embodiments of the present invention, the first photodiode is a silicon photodiode, and the second photodiode is a silicon photodiode with an anti-reflective coating that is most efficient at wavelengths shorter than about 750 nanometers. In yet other embodiments of the present invention, the first photodiode is a silicon photodiode and the second photodiode is either a GaAsP or GaP photodiode with an anti-reflective coating. Those of ordinary skill in the art will recognize that the present invention also contemplates other combinations of different types of photosensitive components, with or without anti-reflective coatings. For example, in yet other embodiments of the present invention, the second silicon photodiode is created with a shallow p-n junction to enhance the response to shorter wavelengths. In this example, the photodiode with a shallow p-n junction is preferably at least partially covered with an antireflective coating. Still other such embodiments employ a Schottky-type junction, or a diffusion-type junction.

Both photodiodes may be made on a single piece of silicon, and preferably receive light through a diffuser. The diffuser preferably receives light with a wide field of view and passes the light and infrared energy to the photodiodes. Preferably, the diffuser is a spectrally neutral, white diffuser.

As a result of the different spectral responses of the first and second photodiodes, the two photodiodes respond differently to a particular source of light. The first photodiode produces a first electrical signal. The first signal includes a component in response to visible light energy, and another larger component that is a response to infrared energy. The second photodiode produces a second electrical signal, which includes a component in response to infrared energy and another larger component that is a response to visible light. Therefore, the first photodiode will produce a stronger electrical signal in response to artificial light than if exposed to sunlight, assuming the artificial light and sunlight to be of the same overall magnitude. This is because the artificial light includes greater spectral content of longer wavelengths, especially infrared wavelengths. In contrast, the second photodiode will produce a stronger electrical signal in response to sunlight as compared to its response to artificial light. This is because the spectral content of sunlight is greater in the visible region than in the infrared region.

The present invention incorporates unfiltered photodiodes. If a diffuser is used to alter the angular response, it can be a spectrally neutral, white diffuser. The energy that would otherwise be attenuated by a filter in other designs is freely transmitted to the photodiodes of the present invention. Therefore, the detector areas of the photodiodes of the present invention can be significantly smaller and require less amplification than prior art filtered designs. In addition, it is beneficial to remove the diffuse filters since they are expensive, and may not be adequately thermally stable for use at the environmental temperatures of automobiles.

A sensor according to the present invention produces electrical signals that permit a determination as to whether the energy was emitted by a higher temperature source, such as the sun, or a lower temperature source such as a headlight from a car. Therefore, the first electrical signal is proportionately weaker than the second electrical signal when both are exposed to sunlight, and the first electrical signal is proportionately stronger than the second electrical signal when both are exposed to a lower temperature artificial light. Some embodiments of the invention compare the ratio of the two signals to determine the relative color temperature of the source of energy. Other embodiments add the two signals and use the result as a better measure of overall energy received from the sun than just a typical photodiode or just a visible light sensor. Other embodiments include a gain adjustment, look-up table, or other means for normalizing one of the electrical signals relative to the other electrical signal. This is because one of the photodiodes may have an overall gain for electrical output compared to energy input that is different than the other photodiode. In these embodiments this overall gain is preferably accounted for prior to comparing the signals and making the determination of the type of energy source.

By producing electrical signals that permit distinguishing the type of light source the sensor is exposed to, the present invention permits an actuatable feature of a vehicle, such as a headlight or a passenger heating and cooling system, to be actuated in response to the magnitude and spectral content of the energy incident upon the sensor. For example, it has been determined that some drivers would like their headlights turned on at higher ambient illumination levels on cloudy days and lower ambient illumination levels on clear days. The present invention has been found to be able to distinguish a cloudy day from a clear day where there is a difference in ambient spectral content between the two days.

The sensor of the present invention also produces electrical signals that permit determination of whether or not a vehicle has entered a tunnel. Since tunnels are generally illuminated with artificial light, the light received by the sensor will be spectrally shifted toward longer wavelengths as compared to sunlight. Therefore, the first photodiode would have a proportionately stronger response than the second photodiode to the light received within the tunnel. A processor making this determination could therefore turn on the headlights when the vehicle is in a tunnel.

Figure 3:
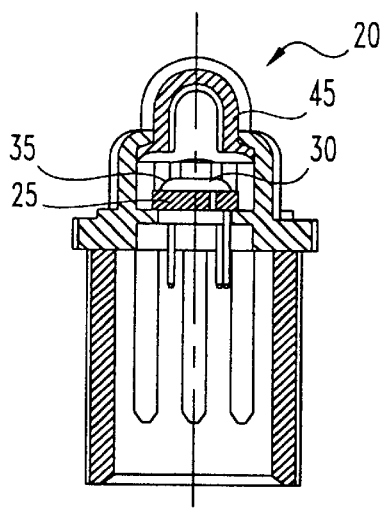
FIG. 3 is a cross-sectional view of the sensor of FIG. 2 as taken along line A—A of FIG. 2.
Figure 1:
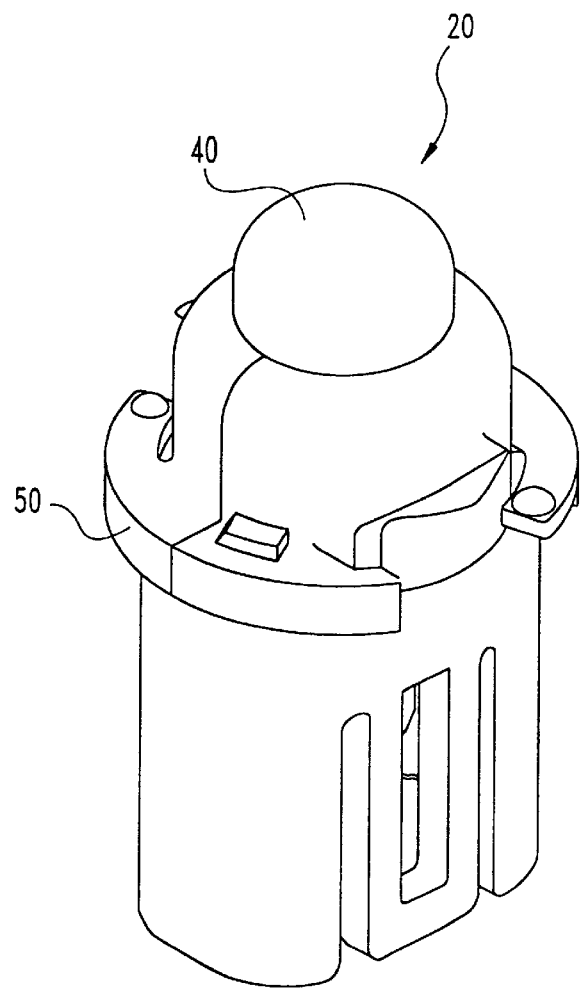
FIG. 1 is a perspective view of a sensor according to one embodiment of the present invention.

A sensor 20 according to one embodiment of the present invention is shown in FIGS. 1, 2 and 3. Sensor 20 includes a detector assembly 25. Mounted to detector assembly 25 are first photodiode 30 and second photodiode 35. Detector assembly 25 also preferably includes analog and/or digital circuitry for processing the signals produced by photodiodes 30 and 35. Preferably, the circuitry includes a function for taking the ratio of the two photodiode signals and a function for taking the sum of the two photodiode signals. The circuitry may include a normalizing feature, such as a look-up table or gain compensation, that accounts for differences between photodiodes 30 and 35 in their overall conversion of radiant energy into electrical energy. Detector assembly 25 also preferably includes the circuitry and/or logic for compensating for the ambient temperature of photodiodes 30 and 35.

Figure 4:
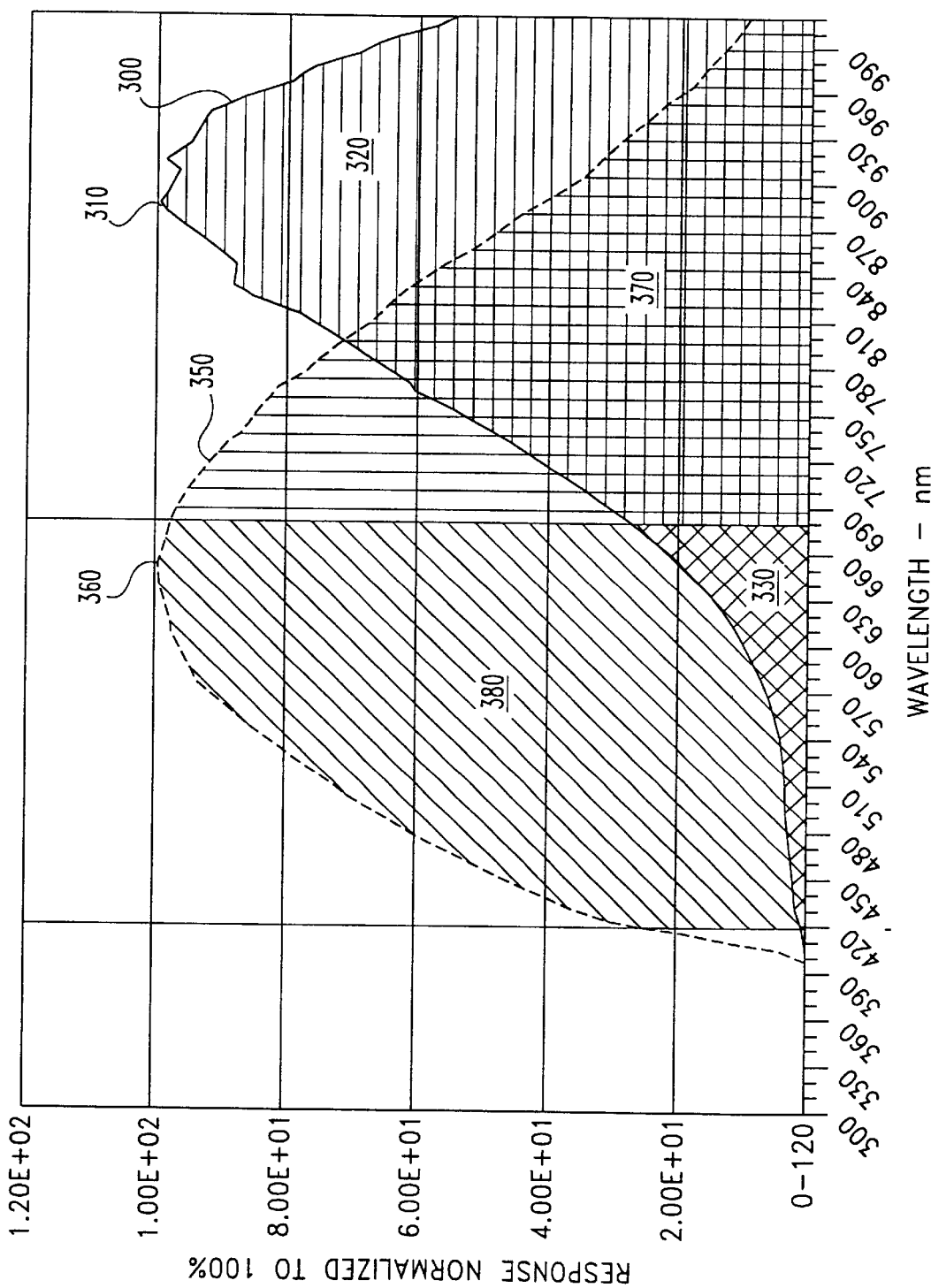
FIG. 4 is a graph showing spectral characteristics of one embodiment of photodiodes according to the present invention.

First photodiode 30 has a response that peaks at a wavelength longer than the wavelengths within the visible spectrum of light. This spectral characteristic 300 is depicted in FIG. 4 as solid line 300. In one embodiment, first photodiode 30 has a peak spectral sensitivity 310 at about 900 nanometers. In yet other embodiments of the present invention, the peak response frequency of photodiode 30 is from about 950 to about 1000 nanometers. Spectral characteristic 300 depicts that photodiode 30 is generally less responsive for those wavelengths shorter than that corresponding to peak sensitivity 310. For example, at 690 nanometers response 300 is less than 30% of the response at peak 310. Thus, first photodiode 30 generally responds more to infrared energy than to visible light.

Examples of first photodiode 30 include, by way of example only, S1336, S1337, S2386, S387, S1087-01, S1133-01, S2839, S2840, S2216, S1721, S1190, S1223, S2506, S2506-01, and 1723-05 and their series, as produced by Hamamatsu Photonics K.K. of Japan, and their equivalents.

Second photodiode 35 has a spectral sensitivity 350 that peaks at a shorter wavelength than the sensitivity of first photodiode 30. In one embodiment of the present invention, photodiode 35 has a spectral characteristic as depicted by dotted line 350 of FIG. 4. Response frequency 350 has a peak 360 at about 660 nanometers. Preferably, peak 360 corresponds to a wavelength about 240 nanometers shorter than the wavelength corresponding to peak sensitivity 310 for photodiode 30. However, in other embodiments of the present invention the sensitivity of second photodiode 35 peaks for a wavelength that is at least about 150 nanometers shorter than the wavelength corresponding to the peak response frequency of first photodiode 30.

Second photodiode 35 has a greater normalized response to visible light than does first photodiode 30. Preferably, the peak response frequency of second photodiode is at a wavelength of about 750 nanometers or less. In one embodiment of the present invention, second photodiode 35 is a GaAsP or GaP type photodiode, such as, by way of example only, the G1115, G1116, G1117, G1735, G1736, G1737, G1125-02, G1126-02, G1745, G1746, G1747, G1961, G1962, and G1963 and their series, produced by Hamamatsu Photonics K.K. of Japan, and their equivalents.

In some embodiments of the present invention, the spectral sensitivity curve of second photodiode 35 may be shifted toward shorter wavelengths by the use of an anti-reflective coating. For example, a one-quarter wavelength thick anti-reflective coating can enhance the capture of electromagnetic energy within a particular wavelength band. Unlike a filter, the one-quarter wavelength anti-reflective coating does not attenuate electromagnetic radiation falling incident upon the photodiode. Preferably, the anti-reflective coating is sized so as to increase the capture of electromagnetic energy at wavelengths shorter than about 750 nanometers. In some embodiments of the present invention, this anti-reflective coating is combined with a GaAsP or GaP type photodiode. In another embodiment the second photodiode is made with a shallow p-n junction to make it more responsive to shorter wavelength light.

FIG. 4 depicts response frequency 300 for photodiode 30 and response frequency 350 for photodiode 35. Both spectral sensitivities are shown normalized such that each peak sensitivity is 100%. Normalization circuitry or algorithms are included in some embodiments of the invention where one photodiode is generally more responsive to received energy than the other photodiode. First photodiode 30 produces an electrical signal with a response to infrared energy 320, shown as the horizontally hatched area under the curve of characteristic 300 from 690 nanometers to 1020 nanometers, and also includes responses at longer wavelengths (not shown). The electrical signal produced by photodiode 30 also includes a response to visible light as depicted by the area 330 under curve 300 between about 430 nanometers and about 690 nanometers. Second photodiode 35 produces an electrical signal which includes a response to infrared energy depicted as vertically hatched area 370 under curve 350 from 690 nanometers to 1020 nanometers, and also including response at longer wavelengths (not shown). The electrical signal of photodiode 35 also includes a response to visible light as depicted by area 380 under curve 350 between about 430 nanometers and about 690 nanometers.

Second photodiode 35 will produce an electrical signal more responsive to visible light than will first photodiode 30, because area 380, related to the visible light response of photodiode 35, is greater than area 330, which is related to the visible light response of first photodiode 30. However, first photodiode 30 is electrically more responsive than second photodiode 35 when both are exposed to electromagnetic radiation with a substantial infrared component. This is because area 320, related to the infrared response of photodiode 30, is greater than area 370, which is related to the infrared response of photodiode 35.

Figure 5:
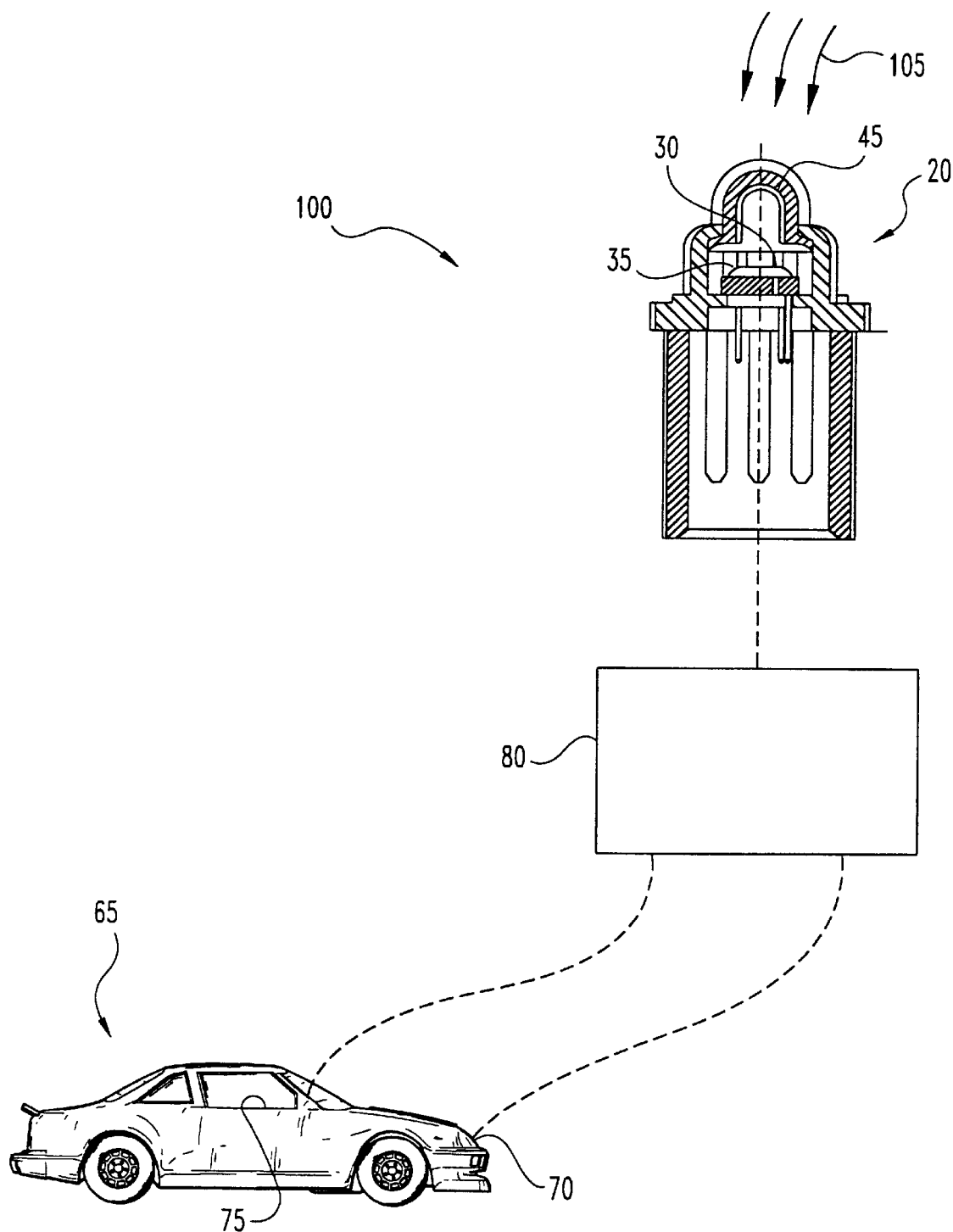
FIG. 5 is a schematic diagram of a system according to one embodiment of the present invention.

FIG. 5 schematically represents a vehicle control system 100 according to one embodiment of the present invention. Light 105 falling incident upon diffuser 45 is passed to and creates a response by photodiodes 30 and 35, so that each diode produces an electrical signal related to the magnitude and spectral content of light 105. The electrical signals from sensor 20 are provided to a controller 80 that receives both signals. Preferably controller 80 is operably connected to actuatable headlights 70 and passenger heating and cooling system 75 within vehicle 65.

Controller 80 actuates headlights 70 and/or heating and cooling system 75 in response to the spectral content of light 105 incident upon sensor 20. Since some passengers feel somewhat cooler on an overcast day than on a clear day of comparable illumination, processor 80 will actuate and adjust the passenger heating and cooling system to maintain the comfort of the passenger. Since the overall amount of energy during the middle of the day is much greater than the overall amount of energy available during twilight, some embodiments of the present invention include two levels of amplification of the electrical signals from first photodiode 30 and second photodiode 35. However, the varying amplification levels do not affect the spectral content of the electrical signals.

Those of skill in the art will recognize that the present invention contemplates that other photosensitive components may be used in place of the photodiodes discussed above.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising:
    a vehicle with an actuatable system;
    a first photosensor with a first peak spectral sensitivity to a first wavelength, said first photosensor receiving light and producing a first electrical signal in response thereto;
    a second photosensor with a second peak spectral sensitivity to a second wavelength, said second photosensor receiving light and producing a second electrical signal in response thereto; and
    a controller for receiving the first electrical signal and the second electrical signal, said controller actuating said actuatable system in response to the first electrical signal and the second electrical signal;
    wherein the second wavelength is at least about 150 nanometers less than the first wavelength, the first wavelength is greater than about 750 nanometers, and the second wavelength is less than about 750 nanometers.

2. The apparatus of claim 1, further comprising:
    a diffuser mounted to said vehicle for receiving and passing ambient light;
    wherein said first photosensor and said second photosensor receive light passed by said diffuser.

3. The apparatus of claim 1, wherein at least a portion of said second photosensor has an antireflective coating which is most efficient at wavelengths shorter than about 750 nanometers.

4. The apparatus of claim 1, wherein said second photosensor comprises a photodiode having a shallow p-n junction.

5. The apparatus of claim 1, wherein said second photosensor comprises a photodiode having a gallium arsenic phosphide semiconductor junction or a gallium phosphide semiconductor junction.

6. The apparatus of claim 5, wherein said junction is a Schottky type junction.

7. The apparatus of claim 5, wherein said junction is a diffusion type junction.

8. The apparatus of claim 1, wherein said controller actuates said actuatable system in response to said first photosensor and said second photosensor receiving light within a tunnel.

9. The apparatus of claim 1, wherein said controller actuates said actuatable system in response to said first photosensor and said second photosensor receiving light from another vehicle.

10. The apparatus of claim 1, wherein said actuatable system comprises a passenger heating and cooling system for said vehicle, said system being actuatable by said controller, said controller actuating said actuatable system in response to the first electrical signal and the second electrical signal.

11. The apparatus of claim 1, wherein said actuatable system comprises a headlight.

12. The apparatus of claim 1, wherein said controller actuates said actuatable system in response to the ratio of the magnitudes of the first electrical signal to the second electrical signal.

13. The apparatus of claim 1, wherein said controller scales said first electrical signal to create a first scaled signal, scales said second electrical signal to create a second scaled signal, adds the first scaled signal and the second scaled signal to create a sum signal, and actuates said actuatable system in response to the sum signal.

14. An apparatus comprising:
    a vehicle with an actuatable system;
    a first photosensor receiving light and infrared energy and producing a first signal in response thereto, the first signal including a first response to infrared energy and a first response to visible light;
    a second photosensor receiving light and infrared energy and producing a second signal in response thereto, the second signal including a second response to infrared energy and a second response to visible light; and
    a controller for receiving the first signal and the second signal, said controller actuating said actuatable system as a function of the first signal and the second signal;
    wherein the first infrared energy response is greater than the second infrared energy response, and the second visible light response is greater than the first visible light response.

15. The apparatus of claim 14, further comprising:
    a diffuser mounted to said vehicle for receiving and passing light and infrared energy;
    wherein said first photosensor and said second photosensor receive light and infrared energy passed by said diffuser.

16. The apparatus of claim 14, wherein at least a portion of said second photosensor has an antireflective coating which is most efficient at wavelengths shorter than about 750 nanometers.

17. The apparatus of claim 14, wherein said second photosensor comprises a photodiode having a shallow p-n junction.

18. The apparatus of claim 14, wherein said second photosensor comprises a photodiode having a gallium arsenic phosphide semiconductor junction or a gallium phosphide semiconductor junction.

19. The apparatus of claim 18, wherein said junction is a Schottky type junction.

20. The apparatus of claim 18, wherein said junction is a diffusion type junction.

21. The apparatus of claim 14, wherein said controller actuates said actuatable system in response to said first photodetector and said second photodetector receiving light within a tunnel.

22. The apparatus of claim 14, wherein said controller actuates said actuatable system in response to said first photodetector and said second photodetector receiving light from another vehicle.

23. The apparatus of claim 14, wherein said actuatable system comprises a passenger heating and cooling system for said vehicle, said system being actuatable by said controller, said controller actuating said actuatable system in response to the first signal and the second signal.

24. The apparatus of claim 14, wherein said actuatable system comprises a headlight.

25. The apparatus of claim 14, wherein said controller actuates said actuatable system in response to the ratio of the magnitudes of the first signal to the second signal.

26. The apparatus of claim 14, wherein said controller scales said first signal to create a first scaled signal, scales said second signal to create a second scaled signal, adds the first scaled signal and the second scaled signal to create a sum signal, and actuates said actuatable system in response to the sum signal.

* * * * *